(12) United States Patent
Kang et al.

(10) Patent No.: US 8,790,559 B2
(45) Date of Patent: Jul. 29, 2014

(54) METHOD FOR PREPARING MICROPOROUS POLYOLEFIN FILM WITH IMPROVED PRODUCTIVITY AND EASY CONTROL OF PHYSICAL PROPERTIES

(75) Inventors: Gwi Gwon Kang, Daejeon (KR); Jang-Weon Rhee, Daejeon (KR); In Hwa Jung, Cheonan-si (KR)

(73) Assignee: SK Innovation Co., Ltd., Seoul (KR)

( * ) Notice: Subject to any disclaimer, the term of this patent is extended or adjusted under 35 U.S.C. 154(b) by 80 days.

(21) Appl. No.: 13/642,072

(22) PCT Filed: Apr. 20, 2011

(86) PCT No.: PCT/KR2011/002808
§ 371 (c)(1),
(2), (4) Date: Dec. 26, 2012

(87) PCT Pub. No.: WO2011/132921
PCT Pub. Date: Oct. 27, 2011

(65) Prior Publication Data
US 2013/0116355 A1    May 9, 2013

(30) Foreign Application Priority Data
Apr. 20, 2010 (KR) .................... 10-2010-0036339

(51) Int. Cl.
| C08J 5/18 | (2006.01) |
| B29C 55/00 | (2006.01) |
| B29C 55/12 | (2006.01) |
| B29C 55/14 | (2006.01) |
| B29C 55/30 | (2006.01) |

(52) U.S. Cl.
USPC .............. 264/210.7; 264/288.8; 264/289.6; 264/290.2; 264/291; 521/143

(58) Field of Classification Search
USPC ............. 264/210.7, 288.8, 289.6, 290.2, 291; 521/143
See application file for complete search history.

(56) References Cited

U.S. PATENT DOCUMENTS

| 5,051,183 A | 9/1991 | Takita et al. |
| 5,830,554 A * | 11/1998 | Kaimai et al. ............... 428/131 |
| 6,245,272 B1 | 6/2001 | Takita et al. |
| 6,566,012 B1 | 5/2003 | Takita et al. |
| 8,252,218 B2 * | 8/2012 | Sano et al. ............... 264/288.4 |
| 2006/0228540 A1* | 10/2006 | Lee et al. ............... 428/317.9 |
| 2007/0116944 A1* | 5/2007 | Lee et al. ............... 428/317.9 |
| 2009/0087749 A1* | 4/2009 | Takita et al. ............... 429/249 |
| 2009/0250838 A1 | 10/2009 | Sano et al. |

FOREIGN PATENT DOCUMENTS

| EP | 2065953 A1 | 6/2009 |
| JP | 2002-88188 | 3/2002 |
| JP | 2009-226736 | 10/2009 |
| JP | 2009-249480 | 10/2009 |
| JP | 2010-000705 | 1/2010 |
| KR | 10-2005-0039745 | 4/2005 |
| KR | 10-2006-0003800 | 1/2006 |
| KR | 10-2006-0106102 | 10/2006 |
| KR | 10-2009-0050686 | 5/2009 |
| KR | 10-2009-0055067 A | 6/2009 |
| KR | 10-2009-0107441 | 10/2009 |
| WO | WO 2010/001722 A2 | 1/2010 |

OTHER PUBLICATIONS

International Search Report from the Korean Patent Office in International Application No. PCT/KR2011/002808 mailed Jan. 12, 2012.

* cited by examiner

*Primary Examiner* — Kara Boyle
(74) *Attorney, Agent, or Firm* — Finnegan, Henderson, Farabow, Garrett & Dunner, LLP

(57) ABSTRACT

Provided is a method of manufacturing a microporous polyolefin film useable as a battery separator, which is easy to control strength, permeability and shrinking properties of the microporous film and embodies excellent quality uniformity and production stability in fabricating the microporous film.

8 Claims, 2 Drawing Sheets

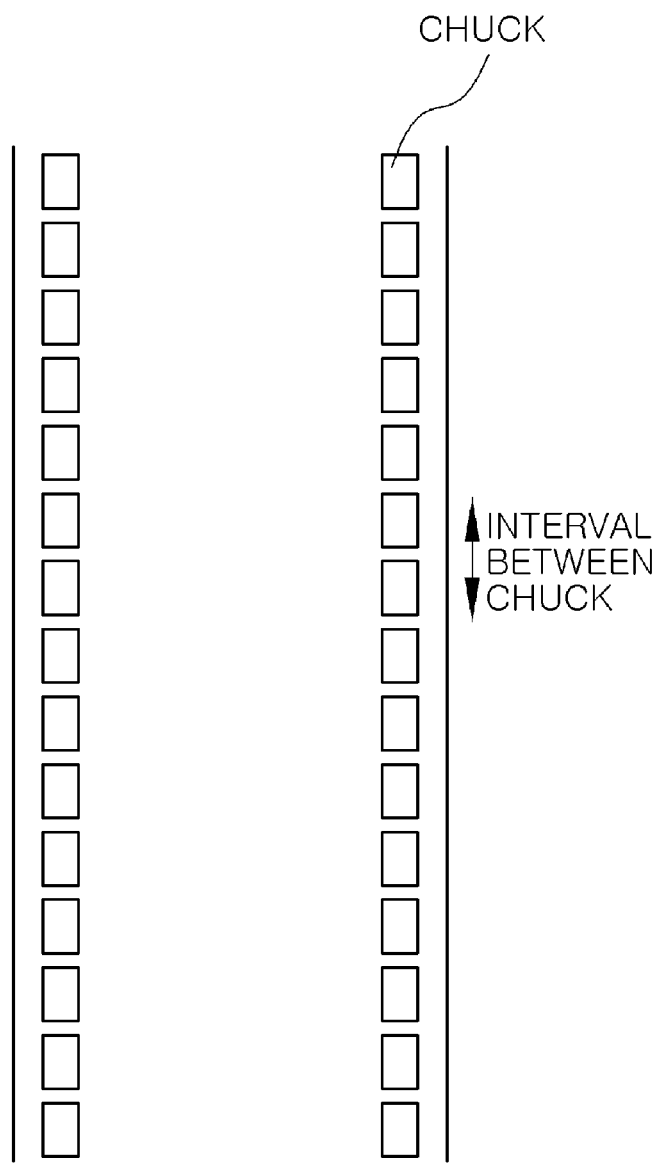

METHOD FOR PREPARING MICROPOROUS POLYOLEFIN FILM WITH IMPROVED PRODUCTIVITY AND EASY CONTROL OF PHYSICAL PROPERTIES

TECHNICAL FIELD

The present invention relates to a method for preparing a microporous polyolefin film capable of being used as a separator for a battery, with beneficial characteristics such as ease of controlling mechanical strength, permeability and thermal-shrinking properties of the microporous film, and excellent uniform quality, production stability, productivity, or the like, compared to existing production methods. More particularly, a stretching process involved in the method for preparing a microporous polyolefin film, which significantly influences determination of shrinkable properties as well physical properties of the microporous film and to provide quality uniformity and production stability of the same.

BACKGROUND ART

A microporous film having excellent chemical stability and superior physical properties is broadly used as a battery separator, a separation filter, a micro-filtration film, or the like.

A method for preparing a microporous film based on polyolefin may be generally classified into four (4) groups: first, formation of a microporous film in a non-woven fabric form by preparing a thin polyolefin fiber; second, a dry process that includes preparing a polyolefin film, stretching the film at a low temperature and causing micro-cracks between lamella, which are a crystal part of the polyolefin, to form micropores; third, a process of forming pores at an interface between polyolefin and a filler during stretching by introducing the filler, for example, an inorganic material, an organic material non-compatible with polyolefin, or the like, into a polyolefin resin. Three of the methods have favorable features such as formation of pores, which proposes desired permeability and reduced production costs to achieve economical benefits, but also have disadvantages such as low mechanical strength, irregular and large pore size, and difficulties in securing quality uniformity. Alternatively, a fourth method is a wet process that includes mixing a polyolefin resin with a diluent (a low molecular weight organic material having a molecular structure similar to polyolefin) at a high temperature at which the polyolefin resin melts as a single phase, occurring phase separation into the polyolefin and the diluent during cooling, and then, extracting the diluent part, to thereby form pores in a resultant film. The wet process generally provides desired mechanical strength and permeability through stretching/extraction after phase separation, has advantageous features such as providing a film having a small and uniform thickness, compared to previously described methods, formation of pores having a uniform size, securing excellent physical properties, or the like, therefore, is widely used in fabricating a separator for a secondary battery such as a lithium ion battery.

With continuous development of high performance secondary batteries since they began to be used in earnest, a battery separator fabricated by a wet process is also increasingly used. In addition, efforts to improve productivity of a microporous film and characteristics of a film by the wet process have been continuously conducted. A representative method may include using ultra-high molecular weight polyolefin (UHMWPO) having a weight-average molecular weight of about 1,000,000 or adding the same to a raw material to increase a molecular weight of a composition to be prepared and using a stretching process to increase a strength of a porous film.

Regarding this, U.S. Pat. Nos. 5,051,183, 5,830,554, 6,245,272 and 6,566,012 describe a method of fabricating a microporous film by using a composition that contains polyolefin having a weight-average molecular weight of not less than 500,000 and a diluent dissolving the polyolefin at a high temperature to prepare a sheet, and then, sequentially conducting a stretching process and a diluent extraction process. In these patents, the stretching process is conducted by uniaxial or biaxial stretching and using a typical tenter, roll, calendar, or the like, or a combination thereof. In relation to the biaxial stretching, the foregoing patents generally describe that both of simultaneous biaxial stretching and sequential biaxial stretching may be used. However, overall examples recited in the above patents are particularly restricted to the simultaneous biaxial stretching or simply describe a biaxial stretching, however, have not specifically defined about stretching temperature in each of the machine and transverse directions. In other words, features of a sequentially biaxial stretching process by using a roll to stretch to the machine direction, and then, to stretch to a transverse direction by using a tenter, features of a simultaneously biaxial stretching process, and differences therebetween were not disclosed in the foregoing patents.

In recent years, among microporous polyolefin films commercially available in the market, products manufactured by a wet process, which are recognized to have excellent performance, may include one stretched after extracting the diluent and the other stretched before extracting diluent. The former has pores formed while extracting the diluent, which are prone to be deformed during stretching, therefore, the stretching process could hardly improve physical properties. Further, since flexibility of the polyolefin free from the diluent is not proper, the stretching process is not easily conducted. On the other hand, the latter allows the polyolefin to become flexible by the diluents, thus allowing the stretching process to be much more easily conducted and securing excellent production stability. Moreover, since a thickness of a film is reduced by stretching, the diluent may be easily removed from the film while extracting after stretching. However, most of the commercialized products formed via the above stretching process before extracting are currently well known in the art as products manufactured by a simultaneously biaxial stretching process.

A simultaneously biaxial stretching process is a stretching method that uses a chuck (an biting device) to grip and fix the top and bottom sides of a sheet prepared by mixing polyolefin and a diluent, similar to thumbs and index fingers of hands of a human, and broadens the gap between chucks in both a machine direction and a transverse direction, simultaneously. In case of the simultaneously biaxial stretching process, a gap between chucks is narrow before stretching, however, broadened by a specific draw ratio after stretching, thus increasing an area not gripped by the chucks (see FIG. 1). Such a non-gripped area has a lower actual stretching ratio than that of a gripped area, to cause non-uniformity in qualities between the gripped area and the non-gripped area. The above tendency is more serious in the case where a stretching ratio is increased, a stretching temperature is decreased for enhancing a mechanical strength, and a sheet before stretching has a relatively large thickness, or the like. For this reason, when a thick film having a high strength is fabricated by the simultaneously biaxial stretching process, a problem of deteriorated uniformity in quality may be encountered. As the application of lithium ion secondary batteries is increased from small electronics to laptop computers, electronic tools, hybrid cars, or the like, a battery separator having high strength and a high thickness is required. Therefore, when a microporous film is fabricated, a stretching ratio and/or a thickness of a sheet before stretching must be increased. However, the simultaneous biaxial drawing process has disadvantages in that quality uniformity is reduced when the sheet is thick and rigid, which can be easily disengaged from the grip chuck, thus causing a decrease in productivity stability.

Further, as for the simultaneously biaxial stretching process, due to difficulties in designing a machine and limitation in equipment costs, it is difficult to design the machine having a variable stretching ratio and apply this in commercial production lines. That is, it is not easy to manufacture commercial products having different characteristics by controlling the stretching ratio.

Korean Patent No. 10-0599898, Japanese Patent No. 2002-088188, Japanese Patent No. 2010-00705, and Japanese Patent No. 2009-226736, respectively, disclose a sequentially biaxial stretching process to sequentially conduct stretching to the machine direction and to the transverse direction. A method of fabricating a battery separator through the sequentially biaxial stretching process disclosed in Korean Patent No. 10-0599898, Japanese Patent No. 2002-088188 and Japanese Patent No. 2010-00705 includes melting/mixing polyolefin, a diluent, and inorganic particles to prepare a sheet, extracting the diluent and the inorganic particles with a solvent to form pores and sequentially stretching the sheet to the machine and transverse directions to enhance a mechanical strength and permeability of the film. However, this method has a limitation in improving the mechanical strength via stretching. Accordingly, the separator with high strength cannot be fabricated via this method. Compared to a mechanical strength improved by orientation of a polyolefin resin during stretching, the deformation of pores easily occurs to enlarge pores. That is, since a size of the pore and permeability of the film tend to excessively increase whereas the mechanical strength is slightly enhanced, an increase in a stretching ratio above a critical level is restricted. In other words, it is difficult to manufacture products having a wide range of mechanical strengths (in particular, a product having puncture strength of not less than $0.25N/\mu m$) and, when a pore size is excessively increased, quality uniformity is seldom secured. The method disclosed in Japanese Patent No. 2009-226736 includes preparing a polyolefin sheet, forming micro-cracks inside crystals by a dry process during stretching to the transverse direction and enlarging the micro-cracks during stretching to the transverse direction, thus providing desired permeability. Compared to formation of pores by using inorganic particles as above described in the foregoing patents, a size of the pore is reduced and a stretching ratio may be increased. However, it is difficult to overcome limitations of a battery separator fabricated by the dry process such as low mechanical strength and reduced quality uniformity.

In view of such circumstances, the present invention proposes application of a sequentially biaxial stretching process to fabricate microporous polyolefin films so that quality uniformity and production stability during manufacturing may be secured, a variety of properties may be provided by controlling physical properties, permeability, shrinking property, or the like, and, in particular, provides a method of fabricating a high strength battery separator.

DISCLOSURE OF INVENTION

Technical Problem

As described above, in order to fabricate a microporous polyolefin film for a lithium ion secondary battery, a process of forming pores to offer permeability to the film and a drawing process for improving a mechanical strength of the film are necessarily conducted.

Pore formation may be performed by a dry process that forms micro-cracks in a resin or induces cracks at an interface between the resin and inorganic particles by adding the inorganic particles to the resin, or a wet process that uses a polyolefin resin and a material to occur phase separation, causes the phase separation, and then, extracts the phase separated material to form pores. As described above, with respect to quality uniformity and quality level, the wet process is superior to the dry process.

When a stretching process to enhance mechanical strength carries out at dry process, the mechanical strength is not much improved since the stretching process at dry process offers improving mechanical properties and forming/enlarging pores. On the other hand, the wet process (limited to a process of stretching before extraction) may conduct stretching while maintaining flexibility of a resin with a diluent, to thereby considerably increase orientation of the resin and easily control orientation. As a result, a variety of microporous films having high and different mechanical strengths may be produced.

Meanwhile, although a method of fabricating a separator via a wet process like a simultaneously biaxial stretching process is well known and commercialized (a separator for a lithium ion secondary battery fabricated by a commercial wet process is generally manufactured by a simultaneously biaxial stretching process), there is a difference in actual stretching ratios between a gripped area by a chuck (a sheet biting device) and a non-gripped area, to deteriorate quality uniformity of a final product. Also, when manufacturing a product having a high strength/a high film thickness, the sheet is prone to be disengaged from the chuck, thus causing difficulty in securing production stability. Furthermore, since a difference in actual stretching ratios between the gripped area and the non-gripped area is relatively higher than a low strength/a low film thickness product, quality uniformity is further deteriorated.

A method of fabricating a separator through sequential biaxial stretching reported in the art is generally classified into three kinds of processes. First, a separator has a mechanical strength as pores induced by a dry process through sequential biaxial stretching. Since The pores are easily deformed during stretching in the dry process, it is difficult to control or improve mechanical strength, and quality uniformity significantly decreases due to enlarged pores, and the increase of stretching ratio is not allowed; as a result, deteriorating productivity. Second, after phase separation is executed by a wet process and a diluent is extracted to form a thick film having pores formed thereon, sequential biaxial stretching is conducted. Similar to the dry process, pores are easily deformed and enlarged during stretching. As a result, problems existing in the dry process, such as low mechanical strength, low quality uniformity, and low productivity due to a low stretching ratio, may not be overcome by the second method, too. Although this method has advantages in that a diluent used herein may allow extruding process to be easily executed and relatively high permeability may be embodied, compared to the dry process, it entails a limitation in that a high mechanical strength cannot be obtained. As a third method, sequential biaxial stretching is executed before a sheet (obtained after phase separation) prepared by a wet process is subjected to extraction. The foregoing methods disclosed in the art include, in general, stretching at the same temperature without separated temperatures control for machine direction stretching and for transverse direction stretching or adopt a method to conduct drawing only when a resin contained in a sheet is substantially molten, thus having a limited range of physical properties to be controlled. In addition, although there are various conditions for stretching process to the machine direction to machine that significantly influence quality uniformity, production stability and productivity during sequential biaxial stretching, only a stretching ratio and a drawing temperature are mentioned in the above methods, therefore, quality uniformity, production stability, productivity, or the like are not determined. Since the stretching was conducted without considering the foregoing conditions, drawing quality was not excellent.

Accordingly, the present invention is directed to provision of a method for manufacturing a microporous polyolefin film by a wet process securing quality uniformity and excellent quality and a sequential stretching process before extraction, which easily controls physical properties and shrinking properties and secures excellent production stability and productivity.

Solution to Problem

With regard to fabrication of a microporous polyolefin film to solve problems described above, the present inventors developed a novel fabricating method, which includes forming pores by a wet process, conducting a stretching process while maintaining a wet state to improve mechanical strength via stretching, and conducting a sequentially biaxial stretching process, to thereby control physical properties and thermal shrinking property and secure quality uniformity and production stability.

According to the present invention, it was surprisingly found that a film having high quality uniformity as well as excellent quality capable of easily controlling physical properties and shrinking property and exhibiting superior production stability and productivity may be fabricated by conducting a stretching process before extracting a diluent, and combining the stretching process with a sequentially biaxial stretching process under specific conditions.

That is, an important feature of the sequentially biaxial stretching process according to the present invention is to use a roll for stretching a sheet to the machine direction, and then, a stretcher of tenter type to conduct stretching to the transverse direction. That is, it was found that, by adopting a combination of the foregoing specific stretching processes and stretching the sheet under individual specific stretching conditions, quality uniformity and production stability may be remarkably enhanced. More particularly, it was found that an area not gripped is almost not present even during stretching to the transverse direction, thus producing a product having noticeably enhanced quality uniformity (FIG. 2).

Moreover, after stretching to the machine direction with a roll, the resultant thin film enters into a stretcher of tenter type to the transverse direction to thereby considerably reduce possibility of disengaging the film out of the stretcher to the transverse direction, therefore, securing unexpected process stability.

According to the present invention, the foregoing object may be accomplished by a method of fabricating a microporous polyolefin film according to the present invention and, more particularly, a fabricating method that at least includes:

(a) melting/mixing/extruding a sheet composition containing a polyolefin composition having a weight-average molecular weight of not less than $1 \times 10^5$ to less than $1 \times 10^6$ (component I) and a diluent (component II) in a ratio by weight of 15-50:85-50 through a T-die, into a sheet form;

(b) using a stretching machine of roll type consisting of at least three rolls to stretch the sheet to the machine direction, and then, stretch the film drawn uni-axially to the machine direction into a transverse direction by stretcher of tenter type, in order to form a film by sequentially biaxial stretching; and (c) extracting the diluent from the stretched film and drying the film.

Before, during or after steps (a) to (c), alternative processes may be added. However, such stretching to the machine and transverse direction must be executed before the extraction/drying process.

According to another embodiment of the present invention, a heat setting process may be further added after the foregoing process, that is, step (c).

The following description will be given to concretely explain preferred embodiments of the present invention. However, the present invention is not particularly limited the embodiments described below, instead being variously modified within the spirit of the present invention.

A process of preparing a sheet by mixing a polyolefin resin and a diluent is described as follows.

A sheet composition may include a polyolefin resin composition: a diluent in a ratio by weight of 15~50:85~50 during melting/mixing/extruding the polyolefin resin and the diluent. If a content of the polyolefin resin is less than 15 wt %, a uniform sheet is not readily formed and, due to a relatively high content of oil in the sheet, slips or appearance faults may occur during stretching to the machine direction by using a stretching machine of roll type. Moreover, since orientation of polymer during stretching is insufficient, a sufficient mechanical strength is not easily achieved. On the other hand, if a content of the polyolefin resin exceeds 50 wt %, extrusion load is increased which deteriorates extrusion performance and considerably reduce permeability of a battery separator. Furthermore, since load applied to a stretching machine during stretching to the machine direction is too high, production stability is rarely secured.

According to the present invention, the polyolefin resin composition may include at least one polyolefin resin alone or a combined material containing at least one polyolefin resin and an inorganic material or any other resin except for the foregoing polyolefin resin.

The polyolefin resin used in the foregoing polyolefin resin composition may include at least one polyolefin resin selected from polyethylene, polypropylene, poly-4-methyl-1-pentene, or the like, which use ethylene, propylene, α-olefin, 4-methyl-1-penten, or the like, as a monomer and a co-monomer, respectively. That is, the polyolefin resin described above may be used alone or as a copolymer or a mixture thereof.

In view of strength, mixing/extruding performance, stretching performance, heat resistance of a final resultant separator, or the like, an example of appropriate polyolefin resins is preferably a high density polyethylene having a co-monomer content of less than 2 wt % or a mixture thereof. The polyethylene resin used herein may have a weight-average molecular weight ranging from $1 \times 10^5$ to $1 \times 10^6$, preferably, $2 \times 10^5$ to $5 \times 10^5$. If the molecular weight is less than $1 \times 10^5$, the strength of the separator may be poor. When the molecular weight exceeds $1 \times 10^6$, mixing/extruding performance and stretching performance are deteriorated, in turn providing poor appearance and uniformity of the separator and causing a problem in implementing high permeability thereof.

In order to improve thermal resistance and permeability of the separator, the resin composition may optionally include an inorganic material or any other kinds of resin except for the polyolefin resin (resins other than the polyolefin resin). Such an additive may be added in an amount of not more than 20 wt %, compared to the polyolefin resin. More particularly, the amount of additive may range from 0.1 to 20 wt %. If the amount exceeds 20 wt %, the mechanical strength of the separator may be rapidly decreased and, film rupture may occur stretching to the machine direction.

Examples of the inorganic material may include calcium carbonate, silica, barium sulfate, talc, mixtures thereof, or the like.

Resins other than polyolefin may include, for example, a polyamide resin (a nylon based resin), polybutylene terephthalate (PBT), polyethylene terephthalate (PET), polychlorotrifluoroethylene (PCTFE), polyoxymethylene (POM), polyvinylfluoride (PVF), polyvinylidene fluoride (PVdF), polycarbonate, polyarylate, polysulfone, polyetherimide, mixtures thereof, or the like.

If required, the resin composition may include any general additives to enhance specific characteristics, such as an oxidation stabilizer, a UV stabilizer, an anti-static agent, or the like, within a range in which characteristics of the separator are not inhibited.

The diluents used in the present invention may include any organic compound combined with the polyolefin resin used in the resin composition to form a single phase at a predetermined extrusion temperature. Examples thereof may include: an aliphatic or cyclic hydrocarbon such as nonane, decane, decalin, a paraffin oil, a paraffin wax, or the like; a phthalic acid ester such as dibutyl phthalate, dioctyl phthalate, or the like; a fatty acid having 10 to 20 carbon atoms, such as palmitic acid, stearic acid, oleic acid, linoleic acid, linolenic acid, or the like; a fatty acid alcohol having 10 to 20 carbon atoms such as palmitic alcohol, stearic alcohol, oleic alcohol, or the like; and mixtures thereof. The paraffin oil, which is non-toxic to the human body and has a higher boiling point and contains a relatively small amount of volatile ingredients, may be suitable. More preferably, the paraffin oil having a kinetic viscosity of 20 cSt to 200 cSt at 40° C. is used. When the kinetic viscosity of the paraffin oil exceeds 200 cSt, the kinetic viscosity during extruding may be high to cause problems such as an increase in extruding load, surface failures of a sheet and/or a film, or the like. Furthermore, it causes difficulties in extraction, leading to problems such as decreasing productivity and reducing permeability of film due to oil residue. If the kinetic viscosity of the paraffin oil is less than 20 cSt, a difference in viscosities between the paraffin oil and the molten polyethylene is so high to cause difficulties in mixing during extruding processing.

The sheet composition may be produced by using a biaxial compounder, a mixer, a Banbury mixer, or the like, which are designed to mix the polyolefin resin used for the resin composition with the diluent, to melt/mix the same, thus obtaining a single phase mixture. The extruding temperature may be a temperature at which the used resin is present in a complete liquid phase (not less than 30° C., compared to a resin melting temperature) and, preferably, ranges from 160 to 300° C., more preferably, 180 to 250° C. By extruding the mixture through a T-die while cooling the same, a sheet type product is formed. Then, through casting or calendaring in water-cooling or air-cooling, a solid phase sheet is obtained. Polyolefin and the diluent used herein may be preliminarily blended and then introduced into the compounder or, otherwise, introduced therein from separated feeders of the polyolefin and the diluent, respectively.

The sheet prepared according to the foregoing processes is subjected to stretching to the machine direction in a range of 4 to 12 times, preferably, 5 to 10 times, by using a stretcher to the machine direction consisting of at least three rolls. If a stretching ratio is less than 4 times, the mechanical strength of the separator is low. When a stretching ratio exceeds 12 times, slips may occur between the roll and the sheet during drawing due to a high degree of orientation of the resin constituting the sheet, thus deteriorating quality uniformity. Moreover, since the film shows significant shrinkage in the machine direction after stretching to the machine direction, deflection of the film at an inlet of the stretcher to the machine direction may occur, in turn causing a difficulty in securing production stability.

The stretcher to the machine direction may have at least one preheating roll, at least one stretching roll, at least one cooling roll or air-cooled device.

The preheating roll means a rear roll among rolls having a relative speed ratio of less than 1.05 (a draw ratio between rolls, a rear roll speed/a front roll speed), and a first roll at the inlet of the stretcher to the machine direction may also be the preheating roll. The preheating rolls may be defined as a section, to which preheating is applied to increase a temperature of the sheet before stretching to reach around a stretching temperature, and a size of the preheat roll and the number of the preheating rolls may depend on a heating time of the sheet before stretching by the roll (a contact time of the sheet to the roll; 'a preheating roll contact time'). In consideration of quality uniformity and production stability, the preheat roll contact time may range from 1 to 500 seconds, preferably 10 to 200 seconds, more preferably 20 to 100 seconds. If the preheating roll contact time exceeds 500 seconds, the sheet is present at a temperature of not less than room temperature for a long time, which in turn causes the diluents to significantly emit from a surface of the sheet, thus causing slips of the sheet on a surface of the roll and consequently inhibiting quality uniformity and production stability. A temperature of the preheating roll may range from [a melting temperature of the resin in the sheet–50° C.] to [a temperature at which 70% of the crystals contained in the resin in the sheet are molten]. Here, in the case where different kinds of resins are mixed and the resin mixture is used in the sheet composition, [the melting temperature of the resin in the sheet] means a melting temperature of one of the plural resins, which is the highest content by weight among all of the resins, in a prepared sheet. Likewise, crystals of the resin in the sheet refer to crystals of the resin, which is contained in the highest content by weight, among all of the resins. The [melting temperature of the resin in the sheet–50° C.] indicates a temperature at which a polymer chain forming a resin crystal begins to exhibit mobility against external stress and, if a temperature is less than the above temperature, the resin has less mobility during stretching, thus causing an internal fracture of sheet in the stretching process or roll slips and consequently inhibiting quality uniformity. Also, if a temperature exceeds the [temperature at which 70% of the crystals contained in the resin in the sheet are molten], the sheet adheres to a surface of the preheating roll due to the high temperature, in turn damaging the sheet surface and causing significant emitting of the diluent due to the high temperature, causing slips of the sheet. As a result, quality uniformity may be inhibited.

The stretching roll means a rear roll among rolls having a speed ratio of 1.05 to 6 (a draw ratio between rolls, a rear roll speed/a front roll speed). The stretching to be conducted by a stretcher to the machine direction is mostly executed by using a stretching roll. If the speed ratio between rolls exceeds 6 in a section defined by one stretching roll, the stretching is excessively performed in a single draw section, in turn applying a strong tensile strength to the sheet. Therefore, slips of the sheet occur on a surface of the roll, thus inhibiting quality uniformity. A size of the drawing roll and the number of drawing rolls may depend on the basis of a total draw ratio to be achieved. For the stretching roll, since a strong tensile strength is applied in a machine direction to the sheet by stretching, slips on the roll surface must be prevented and the sheet on the roll surface must be sufficiently heated. Therefore, a contact length of the sheet to a roll ('a roll contact length') on a roll surface is very important. A roll contact coefficient (Equation 1) means a numeral value to measure and estimate a roll contact length and may suitably range from 1.5 to 54 (degree of angle×m). Preferably, the roll contact coefficient ranges from 3 to 27 (degree of angle×m). If the roll contact coefficient is less than 1.5, a friction force between the sheet and the roll surface is insufficient to allow occurrence of slips caused by tensile strength. In addition, thermal conductivity of the sheet on the roll surface is insufficient, thus inhibiting quality uniformity. On the other hand, when the roll contact coefficient exceeds 54, the orientation of the resin induced by stretching is relaxed due to a long roll contact time and oil is emitted, in turn causing slips and deteriorating drawing effects. As a result, the mechanical strength is decreased.

Roll contact coefficient(degree of angle×m)=[a contact angle(degree) of a sheet to a roll]×[a radius of a roll(m)]   [Equation 1]

On stretching in the stretching rolls, neck-in occurs in a transverse direction. A neck-in is increased when a speed ratio between rolls is high and a section, in which a sheet between rolls does not come into contact with the rolls, is increased. On the other hand, when a stretching speed is high, the time taken to generate transverse shrinkage is relatively short and thus a degree of neck-in is reduced. If the neck-in is great, a product may have a narrow width in the transverse direction, leading to a decrease in productivity. In addition, since a degree of orientation of the resin is decreased, a mechanical strength may be reduced. Further, in a non-contact section between rolls, the sheet does not contact the roll but is subjected to stretching while being exposed to air at room temperature. As a length of the non-contact section is increased, drawing stability is inhibited, in turn deteriorating quality uniformity. Accordingly, a gap between stretching rolls, a location of each of the rolls and a stretching speed must be determined, in consideration of all of production stability, productivity, quality uniformity, or the like. As an indication parameter that briefly summarizes and compares a coefficient of non-contact section between rolls (Equation 2) may range from $0.1 \times 10^{-3}$ to $200 \times 10^{-3}$ minutes ('min'), preferably, ranges from $0.1 \times 10^{-3}$ to $100 \times 10^{-3}$ min and, more preferably, ranges from $0.1 \times 10^{-3}$ to $50 \times 10^{-3}$ min. If the coefficient of non-contact section between rolls is less than $0.1 \times 10^{-3}$ min, drawing is conducted at a high drawing speed and a high draw ratio in a short non-contact section and a high tensile strength is instantaneously applied to the sheet, thus causing roll slips and inconvenience to working efficiency due to a narrow working space. On the other hand, when the coefficient of non-contact section between rolls exceeds $200 \times 10^{-3}$ min, since the non-contact section has a long length between stretching roll, neck-in (shrinkage) of the sheet may be increased, thus reducing productivity and a mechanical strength, and deteriorating quality uniformity.

Coefficient of non-contact section between rolls(min)
=[length of non-contact section(m)]×[1/speed of a rear roll(m/min)]×[speed of a rear roll(m/min)/speed of a front roll(m/min)]   [Equation 2]

Most preferably, in consideration of productivity and physical properties, a stretcher to the machine direction designed while satisfying the foregoing conditions may have a sheet width holding ratio after drawing between respective rolls in the stretching rolls (a sheet width on a surface of the rear roll/a sheet width on a surface of the front roll) of 70 to 99%, and a sheet width holding ratio after overall machine direction drawing (a sheet width at an inlet of the stretcher to the machine direction/a sheet width at an outlet of the stretcher to the machine direction) of 50 to 95%. A suitable temperature of the stretching roll may range from [a melting temperature of the resin in the sheet−50° C.] to [a temperature at which 90% of the crystals contained in the resin in the sheet are molten]. The [melting temperature of the resin in the sheet−50° C.] indicates a temperature at which polymer chains constituting the resin have mobility and, if a temperature is less than this temperature, the mobility of polymer chain in the resin may be decreased, causing ruptures or slips caused by tensile strength during drawing. At a higher temperature than the [temperature at which 90% of the crystals contained in the resin in the sheet are molten], the sheet is jammed on the roll surface which may contaminate the roll surface or the strength of the sheet is decreased due to a high temperature, in turn causing rupture of the sheet during drawing, therefore, reducing production stability and improving the mechanical strength insufficiently. The reason for setting a maximum temperature of the stretching roll at a higher temperature than the [temperature at which 70% of the crystals contained in the resin in the sheet are molten] as a maximum temperature of the preheating roll, is that, in order to reach the [temperature at which 90% of the crystals contained in the resin in the sheet are molten], the resin in the sheet is oriented during stretching, thus increasing a melting temperature. As a result, even the melting temperature becomes the temperature at which 90% of the crystals of the resin in the sheet are molten, preventing the sheet from jamming on the roll surface. Among the stretching rolls (a roll having a speed ratio between rolls of not less than 1.05), the last stretching roll may have a lower temperature than the others. Since a roll provided after the last stretching roll is not used for stretching, it may be set to a lower temperature than the stretching temperature, enabling the resin in the sheet to be frozen while being drawn. The above temperature may be set to the same temperature as that of a cooling roll described below.

Each of the preheating roll and the stretching roll may comprise at least one roll and have a group of rolls or, if required, the preheating roll and the stretching roll may be arranged alternately.

A film stretched by the preheating roll and the stretching roll is subjected to cooling at a lower temperature than the temperature of the stretching roll, in order to maintain an orientation of the film to be frozen. Such a cooling process may be conducted by using a cooling roll or be air-cooled, or may adopt a combination of the cooling roll and the air-cooling method. The cooling roll may function to allow the oriented resin during stretching to be frozen at a lower temperature than the temperature of the stretching roll and to maintain the orientation of the resin. The temperature of the cooling roll is set to a temperature 5° C. lower than the temperature of the stretching roll. Since a specific period of time is required to cool the sheet so that the cooling roll may implement its function, a size of the roll and the number of rolls may depend on a roll contact time. A cooling roll contact time may range from 1 to 120 seconds. If the sheet contacts the cooling roll for less than 1 second, the film after drawing is not sufficiently cooled. Therefore, after stretching to the machine direction, a diluent emits due to continuous relaxation, and production stability may be inhibited. On the other hand, if the cooling time exceeds 120 seconds, the cooling is sufficiently executed and favorable, however, equipment costs are high and the number of cooling rolls is excessively increased, in turn causing problems in maintenance of rolls. In addition, the temperature of the cooling roll is preferably a [temperature of the stretching roll−5° C.] or less and, more preferably, ranges from 10° C. to a [temperature of the stretching roll−10° C.]. If the temperature of the cooling roll is higher than the [temperature of the stretching roll−5° C.], a diluent emits from the sheet oriented via stretching, through relaxation of the resin, causing slips or the like, in turn inhibiting production stability, increasing the relaxation of the resin, consequently deteriorating a mechanical strength. When the temperature of the cooling roll is not more than 10° C., the oriented resin is preferably frozen. But moisture in air may be condensed on the roll surface and cause a problem, in turn inhibiting production stability. However, this may be insignificant if an industrial plant has a drying apparatus. After stretching in an air-cooling manner, a drawn film may be cooled by exposing the same to air or by injecting air at a temperature set to the [temperature of the stretching roll−5° C.] to the film. It is preferable to enable the temperature of the film to rapidly reach the [temperature of the stretching −5° C.] or lower as soon as possible. If an air-cooling time is extended, the oriented resin may undergo relaxation, causing oil to be discharged from the film, thus inhibiting production stability. During cooling, a predetermined level of tensile strength must be applied to the resin to minimize the relaxation of the resin, thereby securing production stability. The tensile strength will be more concretely described below.

The stretching ratio of the stretcher to the machine direction may be defined by [a speed of the last stretching roll]/[a speed of the first preheating roll]. The overall stretching ratio of the stretcher to the machine direction may be achieved by a single stretching roll or, otherwise, by several separated stretching rolls. For accomplishment of stretching stability, stretching may be conducted in parts by using several rolls. The rolls used in the stretcher to the machine direction may be made of a metal or ceramic material without particular limitation thereof but must enable temperature control. A roughness of a surface of the roll used in the stretcher to the machine direction may be freely selected in a range on which the sheet closely contacts the roll surface to easily transfer heat while not damaging a surface of the sheet. For a metal material, the roughness may range from 0.1 s to 10 s.

The stretching to the transverse direction is performed by using the stretcher of the tenter type in order to stretch the film for 4 to 9 times in a transverse direction. If the stretching ratio is less than 4 times, a degree of orientation of the resin in the transverse direction is reduced, thus decreasing the mechanical strength of the film. In addition, since the stretching ratio in the transverse direction is low, quality uniformity in the transverse direction may be deteriorated. On the other hand, when the stretching ratio exceeds 9 times, the stretching ratio in the transverse direction is high, which enhances quality uniformity. However, since the tensile strength applied to the film in the transverse direction is increased, the film may disengage out of a chuck or ruptures or the like may occur during stretching to the transverse direction, in turn inhibiting production stability. The stretching ratio of the transverse direction stretching means a ratio of a distance between chucks (a distance between outer ends of the chucks) at the inlet of the stretcher to a distance between chucks (a distance between outer ends of the chucks) at the outlet of the stretcher. The stretching to the transverse direction may be performed by any suitable methods, for example, by stretching the film to a level more than the stretching ratio and then relaxing the same, stretching the film to the stretching ratio, or the like.

The stretcher to the transverse direction may comprise three divisional parts including a preheating part, a stretching part and a heat setting part. The preheating part is a section to heat the film cooled after stretching to the machine direction, in order to be easily stretched in the stretching part, and may optionally stretch the film a little in the transverse direction in order to apply tensile strength to the film. The stretching part is a section in which the film reaches the maximum draw ratio, while the heat setting part is a section in which the stretching ratio may be relaxed or maintained in the range of the maximum draw ratio to a final draw ratio. Each of the sections may have different drawing temperatures. The temperature of the preheating part may be freely selected from the [melting temperature of the resin in the sheet+20° C.] or less. If the temperature is set in a range of temperatures more than the [melting temperature of the resin in the sheet+20° C.], a surface of the film may melt to inhibit quality uniformity and production stability. The stretching part is an important section to determine physical properties of a separator and the temperature in this section significantly influences physical properties and quality stability of the separator. A temperature of the stretching part may be freely determined in a range from the [melting temperature of the resin in the sheet−20° C.] to the [melting temperature of the resin in the sheet+10° C.], depending on required physical properties of the separator, the stretching ratio and the thickness of the separator. When the temperature is set in a range of temperatures of less than the [melting temperature of the resin in the sheet−20° C.], the film may disengage out of the chuck or have a rupture during stretching, in turn inhibiting production stability. On the other hand, if the temperature is set in a range of temperatures of more than the [melting temperature of the resin in the sheet+10° C.], a film during stretching is partially overheated which inhibits quality uniformity and lacks tensile strength at a high temperature, causing film vibration, thus inhibiting production stability and quality uniformity. The heat setting part is a section in which the resin in the film shows relaxation behavior and a tensile strength of the film is decreased, and may be freely selected in a range of temperatures of not more than the [melting temperature of the resin in the sheet]. If the temperature exceeds the [melting temperature of the resin in the sheet], a polyolefin resin in the film is present in a molten state, which rapidly incurs relaxation of the resin, rapidly decreases tensile strength of the film and causes vibration inside the stretcher, thus inhibiting production stability.

As described above, when the stretching to the machine and transverse direction are conducted, the tensile strength applied to a sheet introduced into the stretcher to the machine direction may range from 5 to 50 $N/cm^2$ to the machine direction in order to secure quality uniformity and production stability. More preferably, the tensile strength ranges from 7 to 30 $N/cm^2$. If the tensile strength applied to the sheet introduced into the stretcher to the machine direction is less than 5 $N/cm^2$, the tensile strength of the sheet is decreased during stretching to the machine direction and the degree of the contact of the sheet to the roll is reduced causing occurrences of slips of the sheet on the roll, thus deteriorating quality uniformity and production stability. In addition, due to slips, the sheet on the roll may move to right and left directions or lean on one side, thus causing difficulty in securing production stability. On the other hand, if the tensile strength exceeding 50 $N/cm^2$ is applied, the tensile strength applied to the sheet in the stretcher to the machine direction during stretching may be directly transferred to the casted sheet, in turn influencing a sheet forming process. As a result, a thickness and a shape of the sheet may be not uniform, in turn causing non-uniformity in a thickness and physical properties of the sheet. Moreover, since the tensile strength of the sheet is high even during stretching to the machine direction, stretching is not performed by a difference of roll speed during preheating and stretching but taken place by the tensile strength. Furthermore, the stretching is executed in the overall stretcher to the machine direction and non-uniformity of stretching is increased. Since the stretching is not executed at a gap between rolls but in the overall stretcher to the machine direction, a width holding ratio is reduced and a width of a product is decreased, thus inhibiting productivity. In order to ensure desirable quality uniformity and production stability, a tensile strength in a machine direction of a sheet between a rear end of the stretcher to the machine direction and an inlet of the stretcher to the transverse direction may range from 100 to 700 N/cm². Preferably, the tensile strength ranges from 200 to 600 N/cm². When applying the tensile strength of less than 100 N/cm², a stress in the machine direction is decreased and the resin oriented by stretching to the machine direction may undergo relaxation causing a diluent to emit from the sheet and the occurrence of slips of the sheet on a roll surface, thus inhibiting production stability. Furthermore, an amount of the emitting diluent cannot be controlled, thus inhibiting quality uniformity. On the other hand, when a tensile strength exceeding 700 N/cm² is applied, stretching is conducted by the tensile strength between the rear end of the stretcher to the machine direction and the stretcher to the transverse direction (a longer distance than a gap between rolls) to inhibit quality uniformity. In addition, a width holding ratio is reduced to deteriorate productivity, and leaning of the film caused by the tensile strength may occur, causing the film to disengage out of a chuck of the stretcher to the transverse direction, thus inhibiting production stability.

The film stretched according to the foregoing processes may be subjected to extraction of the diluent contained in the film by using an organic solvent and drying. The organic solvent used in the present invention may include any organic solvent capable of extracting the diluent, without being particularly limited. More preferably, the organic solvent includes methylethylketone, methylene chloride, hexane, or the like, which have high extraction efficiency and are rapidly dried. The extraction may be performed by any conventional extraction method using a solvent, such as immersion, solvent spray, ultrasonic treatment, or the like, which is used alone or as a combination thereof. A content of the diluent residue after extraction must be not more than 2 wt %. If the content of the diluent residue exceeds 2 wt %, physical properties are deteriorated and permeability of the film is reduced. An amount of the diluent residue (an extraction ratio) may significantly depend on an extraction temperature and an extraction time. The extraction temperature is preferably high to increase solubility of the diluents and the solvent. However, in consideration of boiling of the solvent, the extraction temperature may be 40° C. or less. The extraction time may depend on a thickness of a film to be produced, and suitably range from 2 to 4 minutes if a typical microporous film having a thickness of 10 to 30 µm is produced. The film obtained by substituting the diluent with the organic solvent through extraction is subjected to final drying of the organic solvent through drying, thereby fabricating a microporous film. A tensile strength may be applied during the extraction/drying processes, in order to control shrinkage property and physical properties.

For the dried film, a heat setting process is executed by removing a residual stress to reduce a shrinkage rate of the final film. The heat setting process functions to forcedly grip the film, which is shrinkable in a heated state with heat, thus removing the residual stress. The shrinkage and the permeability of the film may be influenced by a heat setting temperature and a heat setting ratio. If the heat setting temperature is high, the stress of the resin is reduced too low, in turn reducing the shrinkage ratio. When the heat setting temperature is too high, the film partially melts to close micropores formed in the film, thus reducing permeability of the film. The heat setting temperature may be selected in a range of temperatures at which 5 to 50 wt % of the crystals in the film are molten. When the heat setting temperature is selected in a range of temperatures of less than the temperature at which 5 wt % of the crystals in the film are molten, reorientation of polyolefin molecules in the film is insufficient, therefore, residual stress is not removed from the film. If the heat setting temperature is selected in a range of temperatures of more than the temperature at which 50 wt % of the crystals in the film are molten, the film is partially molten to close micropores, thus decreasing permeability of the film. In addition, the machine of tenter type is used for a step-by-step heat setting process, as described above, during heat setting, to thereby enhance mechanical properties such as tensile strength, puncture strength, or the like, while reducing a shrinkage ratio. At a first stage of the heat setting process, stretching to the transverse direction is conducted at 20 to 100% to increase permeability of the film and enhance tensile strength and puncture strength. If the stretching is excessively increased to exceed 100%, demerits such as increased shrinkage ratio and excessively enlarged size of pores may be generated, even though permeability and tensile strength are improved. In a second stage, a width of the first stretched film may be shrunk by about 5 to 50%. Transverse shrinking is conducted under heat to alleviate the stress and orientation of the resin, thereby reducing the shrinkage ratio. Here, if a width of a product is shrunk by 50% or more, permeability and puncture strength are decreased too much. On the other hand, if the shrinking is not more than 5%, the stress and the resin orientation are not alleviated, causing an increase in the shrinkage rate and allowing a large size of the pore to be maintained, thus not securing stability of a battery. The heat setting time may be varied to be relatively short where the heat fixing temperature is high, while being extended when the heat fixing temperature is low. Preferably, the heat fixing time ranges from 10 seconds to 2 minutes.

Preferably the foregoing stretching, extraction, and heat setting processes may be executed in a continuous mode.

Advantageous Effects of Invention

As described above, by adopting a combination of stretching before extraction and a specific stretching process according to the present invention and using a heat setting process under specific conditions, problems of quality uniformity and production stability which were immediate causes of quality failures could be overcome, although, other problems in actual production still remain to be solved. Moreover, a microporous film having excellent quality may be provided.

BRIEF DESCRIPTION OF DRAWINGS

The above and other objects, features and advantages of the present invention will become apparent from the following description of preferred embodiments given in conjunction with the accompanying drawings, in which:

FIG. 2 illustrates a stretching method according to the present invention.

MODE FOR THE INVENTION

Figure 1:
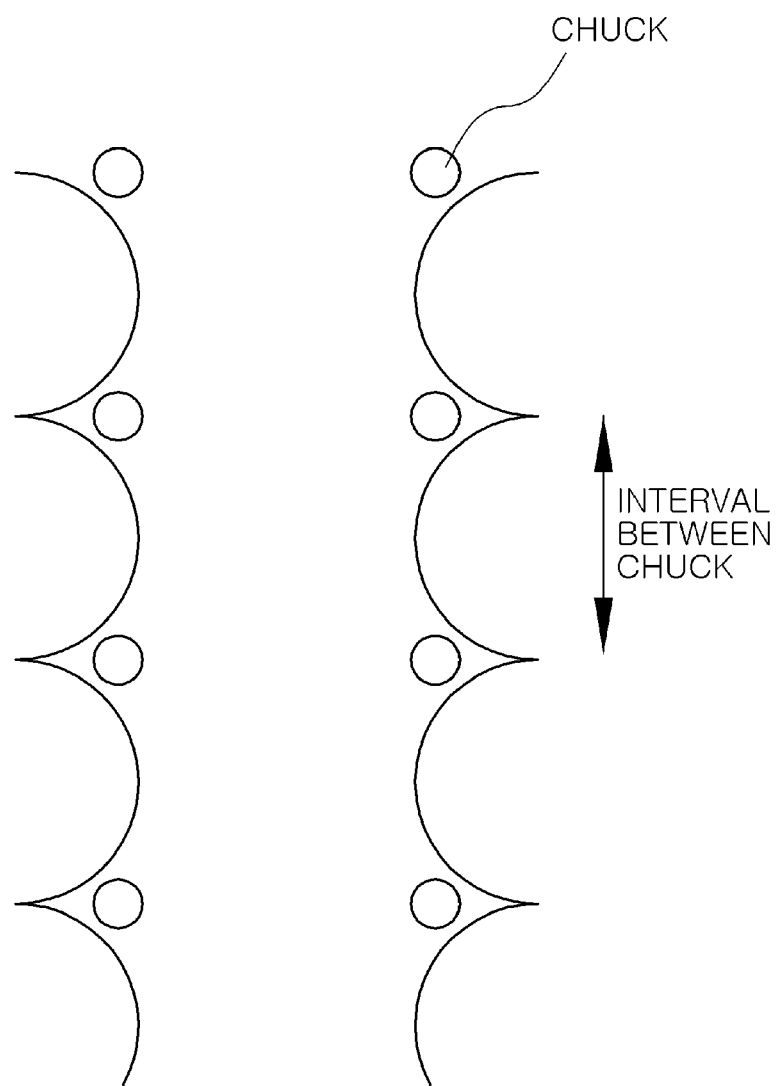
FIG. 1 illustrates a stretching method using a simultaneous stretching process.

Hereinafter, exemplary embodiments of the present invention will be described in detail with reference to accompanying drawings. However, the scope of the present invention is not restricted to the following embodiments.

(1) Molecular Weight

A molecular weight of a polyolefin resin is determined by a high temperature GPC (Gel Permeation Chromatography) available from Polymer Laboratory Co., which uses 1,2,4-trichlorobenzene (TCB) as a solvent and is performed at 140° C. As a standard sample for measurement of molecular weight, polystyrene was used.

(2) Analysis of Thermal Characteristics

For a molded sheet by T-die to be stretched as well as a dried film after extraction, analysis of thermal characteristics was performed by differential scanning calorimetry (DSC; DSC-822E manufactured by Mettler Toledo Co.). Analysis conditions of the dried film after extraction as well as the molded sheet include elevating a temperature of a sample having a weight of 5 mg at a scanning rate of 10° C./min until the molded sheet is completely molten. Following this, by measuring DSC thermogram of the sheet before stretching, a degree of melting resin crystals in the sheet in relation to temperature and a melting temperature thereof were determined.

(3) Film Thickness

Using a TESA Mu-Hite Electronic Height Gauge available from TESA Co., a thickness of a final film was determined with the measuring pressure of 0.63N.

(4) Puncture Strength

After mounting a pin having a diameter of 1 mm and a radius of curvature (RC) of 0.5 mm on a universal testing machine (UTM, Instron Co.), a strength of a separator when the separator is broken at a moving speed of 120 mm/min and 23° C. was determined.

(5) Gas Permeability

Gas permeability was measured by a porometer (CFP-1500-AEL, PMI Co.). In general, the gas permeability is indicated by a Gurley number; however, since the Gurley number cannot compensate for influences of a thickness of the separator, it is difficult to determine a relative permeability in relation to a pore structure of the separator. In order to solve such a problem, the present invention adopted Darcy's permeability constant. Darcy's permeability constant may be calculated by the following Equation and, in the present invention, nitrogen was used.

$$C = (8FTV)/(\pi D^2(P^2-1))$$

wherein, C is Darcy's permeability constant,
F is a flow rate,
T is a thickness of a sample,
V is a viscosity of a gas (0.185 for N2),
D is a diameter of a sample, and
P is a pressure.

According to the present invention, an average value of the Darcy's permeability constants in a region of 100 to 200 psi was used.

(6) Shrinkage Ratio

After preparing a separator by cutting a size of 15 cm by 15 cm, the prepared separator was marked in machine and transverse directions at a gap of 10 cm. Then, the marked separator was interposed between paper sheets, placed in an oven stabilized at 120° C. and left for 60 minutes. Thereafter, a shrinkage ratio was estimated by measuring a variation of the gap. Estimation of the shrinkage ratio was performed by the following Equation.

Shrinkage ratio(%)=100(initial gap gap after leaving at 120° C. for 1 hour)/initial gap (7) Production Stability Production stability was determined by monitoring whether at least 3000 m of the final products are continuously produced without problems.

(8) Quality Uniformity

For the final product, a thickness deviation was determined by measuring thickness of the location in the middle between the center and edge to the transverse direction for 1000 m by 50 m intervals (¼ position among an overall width in a transverse direction).

Quality uniformity(%)={Standard deviation of thickness/average thickness}×100

EXAMPLE 1

A resin composition included 97 wt % of a high density polyethylene having a weight-average molecular weight of $3.0 \times 10^5$ and a melting temperature of 135° C. and 3 wt % of a homopolypropylene having a weight-average molecular weight of $5.7 \times 10^5$ and a melting temperature of 163° C. A diluent was a paraffin oil having a kinetic viscosity of 100 cSt at 40° C. A sheet composition was prepared by mixing the resin composition and the diluent in a ratio by weight of 35:65; mixing, extruding and molding through a twin screw compounder equipped with T-die at 250° C.; and using a casting roll set at 40° C. to prepare a sheet having a width of 300 mm and an average thickness of 1100 μm.

The prepared sheet was introduced into a machine direction stretcher while applying a tensile strength of 10.6 N/cm² in the machine direction, and preheated in a preheating roll having six (6) rolls and set at 115° C. for 76 seconds. A stretching roll which consists of four (4) rolls and is set at 118° C., and in which each of the rolls has a roll contact coefficient of 13.5 degree (of angle)×m, was used. Also, these rolls have a coefficient of non-contact section between rolls of $17.9 \times 10^{-3}$ min, $14.9 \times 10^{-3}$ min, $12.4 \times 10^{-3}$ min and $10.3 \times 10^{-3}$ min, respectively. Stretching was conducted in parts by these four rolls, such that a maximum stretching ratio at one stretching roll becomes 3.2 times and an overall stretching ratio in a machine direction is 6 times, at a final speed of 12 m/min. Last, a cooling roll which consists of three (3) rolls, is set at 60° C. and rotates at the same speed as of the last stretching roll, was used to cool the film for 7 seconds. A width holding ratio of the machine direction stretched film was 74.6%.

The machine direction stretched film was introduced into a transverse direction stretcher while applying a tensile strength of 280 N/cm² in the machine direction, and subjected to transverse direction drawing at 118° C. (using a preheating part, a stretching part and a heat setting part) to reach 6 times. Thermal relaxation was not carried out in the heat setting part.

The film completely stretched in machine and transverse directions was treated by using methylene chloride at room temperature to remove the diluent, extended up to 140% at 128° C. in the transverse direction, by using heat setting equipment of tenter type, and subjected to shrinking by 14.3%, compared to a final width in the extension process.

For the resultant separator prepared as described above, puncture strength, permeability, shrinkage ratio, average thickness in a machine direction, a thickness deviation, and production stability are listed in the following TABLE 1.

EXAMPLE 2

A sheet composition was prepared by using a high density polyethylene having a weight-average molecular weight of $3.0\times10^5$ and a melting temperature of 135° C., and a paraffin oil having a kinetic viscosity of 100 cSt at 40° C. as a diluent in a ratio by weight of 30:70. The prepared sheet composition was subjected to mixing, extruding and molding through a twin screw compounder equipped with T-die at 250° C. and treated by using a casting roll set at 40° C., thereby resulting in a sheet having a width of 600 mm and an average thickness of 2000 μm.

The prepared sheet was introduced into a machine direction stretcher while applying a tensile strength of 16.7 N/cm$^2$ in the machine direction, and preheated in a preheating roll having eight (8) rolls and set at 110° C. for 50 seconds. A stretching roll which consists of six (6) rolls and is set at 108° C., and in which each of the rolls has a roll contact coefficient of 13.5 degree (of angle)×m, was used. Also, these rolls have a coefficient of non-contact section between rolls of $8.42\times 10^{-3}$ min, $7.66\times10^{-3}$ min, $6.37\times10^{-3}$ min, $4.83\times10^{-3}$ min, $3.33\times10^{-3}$ min and $2.15\times10^{-3}$ min, respectively. Stretching was conducted in parts by these six rolls, such that a maximum stretching ratio at one stretching roll becomes 1.7 times and an overall stretching ratio in a machine direction is 7.5 times, at a final speed of 30 m/min. Last, a cooling roll which consists of three (3) rolls, is set at 80° C. and rotates at the same speed as the last stretching roll, was used to cool the film for 5 seconds. For a total of 17 rolls including the preheating rolls, the stretching rolls, the cooling rolls and the pinch rolls were used. A width holding ratio of the machine direction stretched film was 72.3%.

The machine direction stretched film was introduced into a transverse direction stretcher while applying a tensile strength of 392 N/cm$^2$ in the machine direction and subjected to transverse direction stretching using a transverse direction stretcher, which includes a preheating part set at 124° C., a stretching part set at 120° C. and a heat setting part set at 116° C., to reach a maximum stretching ratio of 8.4 times (120%). Then, thermal relaxation was carried out in the heat setting part to reach 7 times, thus a final transverse direction stretching ratio of 7 times.

The film completely stretched in machine and transverse directions was treated by using methylene chloride at room temperature to remove the diluent, extended up to 145% at 129° C. in the transverse direction, by using heat setting equipment of tenter type, and subjected to shrinking by 17.2%, compared to a final width in the extension process.

For the resultant separator prepared as described above, puncture strength, permeability, shrinkage ratio, average thickness in a machine direction, a thickness deviation, and production stability are listed in the following TABLE 1.

EXAMPLE 3

A resin composition included 90 wt % of a high density polyethylene having a weight-average molecular weight of $3.0\times10^5$ and a melting temperature of 135° C. and 10 wt % of calcium carbonate having an average particle size of 0.8 μm. A diluent was a paraffin oil having a kinetic viscosity of 100 cSt at 40° C. A sheet composition was prepared by mixing the resin composition and the diluent in a ratio by weight of 40:60; mixing, extruding and molding through a twin screw compounder equipped with T-die at 250° C.; and using a casting roll set at 40° C. to prepare a sheet having a width of 800 mm and an average thickness of 640 μm.

The prepared sheet was introduced into a machine direction stretcher while applying a tensile strength of 19.5 N/cm$^2$ in the machine direction, and preheated in a preheating roll having nine (9) rolls and set at 110° C. for 91 seconds. A stretching roll which consists of four (4) rolls and is set at 95° C., and in which each of the rolls has a roll contact coefficient of 13.5 degree (of angle)×m, was used. Also, these rolls have a coefficient of non-contact section between rolls of $13.9\times10^{-3}$ min, $11.6\times10^{-3}$ min, $8.27\times10^{-3}$ min and $5.27\times10^{-3}$ min, respectively. Stretching was conducted in parts by these four rolls, such that a maximum stretching ratio at one stretching roll becomes 2.7 times and an overall stretching ratio in a machine direction is 8.5 times, at a final speed of 20 m/min. Last, a cooling roll which consists of four (4) rolls, is set at 40° C. and rotates at the same speed as of the last stretching roll, was used to cool the film for 5 seconds. A width holding ratio of the machine direction stretched film was 67.7%.

The machine direction stretched film was introduced into a transverse direction stretcher while applying a tensile strength of 427 N/cm$^2$ in the machine direction, and subjected to transverse direction stretching using a transverse direction stretcher, which includes a preheating part set at 114° C., a stretching part set at 110° C. and a heat setting part set at 105° C., to reach a maximum stretching ratio of 7.7 times (110%). Then, thermal relaxation was carried out in the heat setting part to reach 7 times, thus a final transverse direction stretching ratio was 7 times.

The film completely stretched in machine direction and transverse direction was treated by using methylene chloride at room temperature to remove the diluent, extended up to 150% at 130° C. in the transverse direction, by using heat setting equipment of tenter type, and subjected to shrinking by 20%, compared to a final width in the extension process.

For the resultant separator prepared as described above, puncture strength, permeability, shrinkage ratio, average thickness in a machine direction, a thickness deviation, and production stability are listed in the following TABLE 1.

COMPARATIVE EXAMPLE 1

A sheet composition was prepared by using a high density polyethylene having a weight-average molecular weight of $3.0\times10^5$ and a melting temperature of 135° C., and a paraffin oil having a kinetic viscosity of 100 cSt at 40° C. as a diluent in a ratio by weight of 40:60. The prepared sheet composition was subjected to mixing, extruding and molding through a twin screw compounder equipped with T-die at 250° C. and treated by using a casting roll set at 40° C., thereby resulting in a sheet having a width of 200 mm and an average thickness of 1600 μm.

Although the prepared sheet was stretched by using a simultaneous stretcher at 117° C. in machine and transverse directions for 7 times, respectively, to reach a final speed of 5 m/min after stretching, the film disengaged out of the chuck as a tensile strength to the film increased during progress of the stretching. As a result, the drawing could not be completed.

COMPARATIVE EXAMPLE 2

A sheet composition was prepared by using a high density polyethylene having a weight-average molecular weight of $3.0\times10^5$ and a melting temperature of 135° C., and a paraffin oil having a kinetic viscosity of 100 cSt at 40° C. as a diluent in a ratio by weight of 35:65. The prepared sheet composition was subjected to mixing, extruding and molding through a twin screw compounder equipped with T-die at 250° C. and treated by using a casting roll set at 40° C., thereby resulting in a sheet having a width of 200 mm and an average thickness of 1400 μm.

The prepared sheet was drawn by using a simultaneous stretcher at 118° C. in machine and transverse directions for 6.5 times, respectively, to reach a final speed of 5 m/min after stretching.

The film completely stretched in machine and transverse directions was treated by using methylene chloride at room temperature to remove the diluent, extended up to 135% at 127° C. in the transverse direction, by heat setting equipment of tenter type, and subjected to shrinking by 11.1%, compared to a final width in the extension process.

For the resultant separator prepared as described above, puncture strength, permeability, shrinkage ratio, average thickness in a machine direction, a thickness deviation, and production stability are listed in the following TABLE 1.

COMPARATIVE EXAMPLE 3

A sheet composition was prepared by using a high density polyethylene having a weight-average molecular weight of $3.0 \times 10^5$ and a melting temperature of 135° C., and a paraffin oil having a kinetic viscosity of 100 cSt at 40° C. as a diluent in a ratio by weight of 35:65. The prepared sheet composition was subjected to mixing, extruding and molding through a twin screw compounder equipped with T-die at 250° C. and treated by using a casting roll set at 40° C., thereby resulting in a sheet having a width of 700 mm and an average thickness of 1200 μm.

The prepared sheet was introduced into a machine direction stretcher while applying a tensile strength of 17.9 N/cm$^2$ in the machine direction, and preheated in a preheating roll having eight (8) rolls and set at 115° C. for 75 seconds. A stretching roll which consists of two (2) rolls and is set at 115° C., and in which each of the rolls has a roll contact coefficient of 13.5 degree (of angle)×m, was used. Also, these rolls have a coefficient of non-contact section between rolls of $14.3 \times 10^{-3}$ min and $13.4 \times 10^{-3}$ min, respectively. Stretching was conducted in parts by these two rolls, such that a maximum stretching ratio at one stretching roll is 6.9 times and an overall stretching ratio in a machine direction is 8.5 times, at a final speed of 20 m/min. Last, a cooling roll which consists of three (3) rolls, is set at 50° C. and rotates at the same speed as the last stretching roll, was used to cool the film for 4 seconds.

Since slips occurred at the stretching roll which stretches 6.9 times and, after machine direction stretching, a thickness and a width of the film were unstable, transverse direction stretching could not be executed.

COMPARATIVE EXAMPLE 4

A sheet composition was prepared by using a high density polyethylene having a weight-average molecular weight of $3.0 \times 10^5$ and a melting temperature of 135° C., and a paraffin oil having a kinetic viscosity of 100 cSt at 40° C. as a diluent in a ratio by weight of 30:70. The prepared sheet composition was subjected to mixing, extruding and molding through a twin screw compounder equipped with T-die at 250° C. and treated by using a casting roll set at 40° C., thereby resulting in a sheet having a width of 600 mm and an average thickness of 1800 μm.

The prepared sheet was introduced into a machine direction stretcher while applying a tensile strength of 3.7 N/cm$^2$ in the machine direction, and preheated in a preheating roll having eight (8) rolls and set at 116° C. for 94 seconds. A stretching roll which consists of six (6) rolls and is set at 110° C., and in which each of the rolls has a roll contact coefficient of 13.5 degree (of angle)×m, was used. Also, these rolls have a coefficient of non-contact section between rolls of $15.7 \times 10^{-3}$ min, $12.1 \times 10^{-3}$ min, $9.3 \times 10^{-3}$ min, $7.10 \times 10^{-3}$ min, $5.46 \times 10^{-3}$ min and $3.90 \times 10^{-3}$ min, respectively. Stretching was conducted in parts by these six rolls, such that a maximum stretching ratio at one stretching roll is 1.5 times and an overall stretching ratio in a machine direction is 7 times, at a final speed of 15 m/min. Last, a cooling roll which consists of three (3) rolls, is set at 40° C. and rotates at the same speed as the last stretching roll, was used to cool the film for 6 seconds.

Since slips of the sheet occurred during machine direction stretching and the sheet leaned to one side, transverse direction stretching could not be executed.

COMPARATIVE EXAMPLE 5

A sheet composition was prepared by using a high density polyethylene having a weight-average molecular weight of $3.0 \times 10^5$ and a melting temperature of 135° C., and dioctylphthalate as a diluent in a ratio by weight of 25:75. The prepared sheet composition was subjected to mixing, extruding and molding through a twin screw compounder equipped with T-die at 250° C. and treated by using a casting roll set at 40° C., thereby resulting in a sheet having a width of 300 mm and an average thickness of 1350 μm.

The prepared sheet was introduced into a machine direction stretcher while applying a tensile strength of 14.8 N/cm$^2$ in the machine direction, and preheated in a preheating roll having ten (10) rolls and set at 117° C. for 338 seconds. A stretching roll which consists of four (4) rolls and is set at 117° C., and in which each of the rolls has a roll contact coefficient of 13.5 degree (of angle)×m, was used. Also, these rolls have a coefficient of non-contact section between rolls of $244 \times 10^{-3}$ min, $174 \times 10^{-3}$ min, $113 \times 10^{-3}$ min and $66.8 \times 10^{-3}$ min, respectively. Stretching was conducted in parts by these four rolls, such that a maximum stretching ratio at one stretching roll is 2.0 times and an overall stretching ratio in a machine direction is 9 times, at a final speed of 6 m/min. Last, a cooling roll which consists of three (3) rolls, is set at 50° C. and rotates at the same speed as the last stretching roll, was used to cool the film for 14 seconds. For one preheating roll located at the inlet of the machine direction stretcher as well as three cooling rolls, pinch rolls were used. A width holding ratio of the machine direction stretched film was 44.7%.

The machine direction stretched film was introduced into a transverse direction stretcher while applying a tensile strength of 525N/cm$^2$ in the machine direction, and subjected to transverse direction stretching using a transverse direction stretcher, which includes a preheating part set at 125.5° C., a stretching part set at 125.5° C. and a heat setting part set at 118° C., to reach 5 times. Thermal relaxation was not carried out.

The film completely stretched in machine and transverse directions was treated by using methylene chloride at room temperature to remove the diluent, extended up to 150% at 128° C. in the transverse direction, by using heat setting equipment of tenter type, and subjected to shrinking by 23.3%, compared to a final width in the extension process.

The resultant separator prepared as described above had a width of 60% (=134 mm/224 mm) compared to that of the product according to Example 1, after machine direction stretching, therefore, a width of the final product showed 60% or less of productivity. For the width of the separator, puncture strength, permeability, shrinkage ratio, average thickness in a machine direction, a thickness deviation, and production stability are listed in the following TABLE 1.

COMPARATIVE EXAMPLE 6

A sheet composition was prepared by using a high density polyethylene having a weight-average molecular weight of $3.0 \times 10^5$ and a melting temperature of 135° C., and a paraffin oil having a kinetic viscosity of 100 cSt at 40° C. as a diluent in a ratio by weight of 30:70. The prepared sheet composition was subjected to mixing, extruding and molding through a twin screw compounder equipped with T-die at 250° C. and treated by using a casting roll set at 40° C., thereby resulting in a sheet having a width of 650 mm and an average thickness of 1500 µm.

The prepared sheet was introduced into a machine direction stretcher while applying a tensile strength of 18.5 N/cm² in the machine direction, and preheated in a preheating roll having ten (8) rolls and set at 122° C. for 61 seconds. A stretching roll which consists of six (6) rolls and is set at 123° C., and in which each of the rolls has a roll contact coefficient of 13.5 degree (of angle)×m, was used. Also, these rolls have a coefficient of non-contact section between rolls of $10.1 \times 10^{-3}$ min, $7.49 \times 10^{-3}$ min, $5.50 \times 10^{-3}$ min, $4.05 \times 10^{-3}$ min, $2.98 \times 10^{-3}$ min and $2.19 \times 10^{-3}$ min, respectively. Stretching was conducted in parts by these six rolls, such that a maximum stretching ratio at one stretching roll becomes 1.4 times and an overall stretching ratio in a machine direction is 7.5 times, at a final speed of 25 m/min. Last, a cooling roll which consists of three (3) rolls, is set at 40° C. and rotates at the same speed as the last stretching roll, was used to cool the film for 3 seconds.

In contrast to the stretching roll, since sheet sticking occurred on a surface of the preheating roll during machine direction stretching and impurities were deposited on the roll, the film had poor appearance after stretching and the stretching was stopped.

COMPARATIVE EXAMPLE 7

A sheet composition was prepared by using a high density polyethylene having a weight-average molecular weight of $3.0 \times 10^5$ and a melting temperature of 135° C., and a paraffin oil having a kinetic viscosity of 100 cSt at 40° C. as a diluent in a ratio by weight of 40:60. The prepared sheet composition was subjected to mixing, extruding and molding through a twin screw compounder equipped with T-die at 250° C. and treated by using a casting roll set at 40° C., thereby resulting in a sheet having a width of 500 mm and an average thickness of 1300 µm.

The prepared sheet was introduced into a machine direction stretcher while applying a tensile strength of 23.1 N/cm² in the machine direction, and preheated in a preheating roll having seven (7) rolls and set at 105° C. for 53 seconds. A stretching roll which consists of three (3) rolls and is set at 105° C., and in which each of the rolls has a roll contact coefficient of 13.5 degree (of angle)×m, was used. Also, these rolls have a coefficient of non-contact section between rolls of $11.3 \times 10^{-3}$ min, $7.09 \times 10^{-3}$ min and $3.90 \times 10^{-3}$ min, respectively. Stretching was conducted in parts by these three rolls, such that a maximum stretching ratio at one stretching roll becomes 2.0 times and an overall stretching ratio in a machine direction is 6.5 times, at a final speed of 20 m/min. Last, a cooling roll which consists of three (3) rolls, is set at 80° C. and rotates at the same speed as the last stretching roll, was used to cool the film for 4 seconds. A width holding ratio of the machine direction stretched film was 73.6%.

Although the machine direction stretched film was introduced into a transverse direction stretcher while applying a tensile strength of 859 N/cm² in the machine direction, the film leaned toward one side and dropped out of a chuck at one side of the transverse direction stretcher, therefore, stretching could not be executed.

COMPARATIVE EXAMPLE 8

A sheet composition was prepared by using a high density polyethylene having a weight-average molecular weight of $3.0 \times 10^5$ and a melting temperature of 135° C., and a paraffin oil having a kinetic viscosity of 100 cSt at 40° C. as a diluent in a ratio by weight of 30:70. The prepared sheet composition was subjected to mixing, extruding and molding through a twin screw compounder equipped with T-die at 250° C. and treated by using a casting roll set at 40° C., thereby resulting in a sheet having a width of 300 mm and an average thickness of 1500 µm.

The prepared sheet was introduced into a machine direction stretcher while applying a tensile strength of 12 N/cm² in the machine direction, and preheated in a preheating roll having eight (8) rolls and set at 112° C. for 149 seconds. A stretching roll which consists of six (6) rolls and is set at 112° C., and in which each of the rolls has a roll contact coefficient of 13.5 degree (of angle)×m, was used. Also, these rolls have a coefficient of non-contact section between rolls of $24.8 \times 10^{-3}$ min, $22.5 \times 10^{-3}$ min, $18.8 \times 10^{-3}$ min, $14.4 \times 10^{-3}$ min, $9.6 \times 10^{-3}$ min and $6.01 \times 10^{-3}$ min, respectively. Stretching was conducted in parts by these six rolls, such that a maximum stretching ratio at one stretching roll becomes 1.85 times and an overall stretching ratio in a machine direction is 9 times, at a final speed of 12 m/min. Last, a cooling roll which consists of three (3) rolls, is set at 100° C. and rotates at the same speed as the last stretching roll, was used to cool the film for 7 seconds. A width holding ratio of the machine direction stretched film was 73.3%.

Although the machine direction stretched film was introduced into a transverse direction stretcher while applying a tensile strength of 43.3/cm² in the machine direction, the diluent emitted from stretched film at the cooling rolls and was deposited thereon, and the sheet leaned toward one side and disengaged out of a chuck at one side of the transverse direction stretcher, therefore, stretching could not be executed.

TABLE 1

| | Thickness (µm) | Puncture strength (N/µm) | Permeability (Darcy) $\times 10^{-5}$ | Shrinkage ratio (%) MD | Shrinkage ratio (%) TD | Production stability | Quality uniformity |
|---|---|---|---|---|---|---|---|
| Ex. 1 | 26 | 0.35 | 2.5 | 7 | 7 | Pass | 1.3% |
| Ex. 2 | 33 | 0.45 | 2.1 | 8 | 4 | Pass | 1.5% |
| Ex. 3 | 8 | 0.30 | 4.9 | 5 | 6 | Pass | 1.1% |
| Com. Ex. 1 | — | — | — | — | — | Fail | — |
| Com. Ex. 2 | 25 | 0.32 | 2.8 | 10 | 14 | Pass | 2.5% |
| Com. Ex. 3 | — | — | — | — | — | Fail | — |
| Com. Ex. 4 | — | — | — | — | — | Fail | — |
| Com. Ex. 5 | 25 | 0.27 | 3.8 | 8 | 10 | Pass | 2.3% |
| Com. Ex. 6 | — | — | — | — | — | Fail | — |
| Com. Ex. 7 | — | — | — | — | — | Fail | — |
| Com. Ex. 8 | — | — | — | — | — | Fail | — |

As described above, by adopting a combination of stretching before extraction and a specific stretching process according to the present invention and using a heat setting process under specific conditions, problems of quality uniformity and production stability which were immediate causes of quality failures could be overcome, although, other problems in actual production still remain to be solved. Moreover, a microporous film having excellent quality may be provided.

INDUSTRIAL APPLICABILITY

As described above, by adopting a combination of stretching before extraction and a specific stretching process according to the present invention and using a heat setting process under specific conditions, problems of quality uniformity and production stability which were immediate causes of quality failures could be overcome, although, other problems in actual production still remain to be solved. Moreover, a microporous film having excellent quality may be provided.

The invention claimed is:

1. A method of manufacturing a microporous polyolefin film using a roll-type stretching machine, comprising:
  (a) melting, mixing, and extruding a composition containing a polyolefin composition having a weight-average molecular weight of not less than $1 \times 10^5$ to less than $1 \times 10^6$ (component I) and a diluent (component II) in a weight ratio of 15-50:85-50, and shaping the composition into a sheet form through a T-die;
  (b) using the roll-type stretching machine, which comprises at least three rolls, to stretch the sheet uniaxially in the machine direction, and then, after stretching uniaxially in the machine direction, stretching the sheet in transverse direction using a tenter-type stretching machine, in order to form a film by sequential biaxial stretching; and
  (c) extracting the diluent from the stretched film and then drying the film,
  wherein the roll-type stretching machine includes at least one preheating roll, at least one stretching roll and at least one cooling roll or air-cooled device, and
  a total roll contact time of the sheet on the preheating roll ranges from 1 to 500 seconds, the stretching is executed in at least one section between rolls, a stretching ratio in one section between two rolls ranges from 1.05 to 6 times, a roll contact coefficient of the sheet on the stretching roll ranges from 1.5 to 54 degree (of angle)× m, where m is the radius of the roll, and a coefficient of non-contact section between rolls ranges from $0.1 \times 10^{-3}$ to $200 \times 10^{-3}$ min.

2. The method of claim 1, wherein the polyolefin composition in step (a) includes at least one polyolefin resin component, or 80 to 99.9 wt % of at least one polyolefin resin and 0.1 to 20 wt % of a component selected from an inorganic material or resins other than for the polyolefin resin.

3. The method of claim 1, wherein the coefficient of non-contact section between rolls of the stretching roll ranges from $0.1 \times 10^{-3}$ to $100 \times 10^{-3}$ min.

4. The method of claim 1, wherein the coefficient of non-contact section between rolls of the stretching roll ranges from $0.1 \times 10^{-3}$ to $50 \times 10^{-3}$ min.

5. The method of claim 1, wherein stretching in the machine direction is performed by stretching the sheet introduced into the roll-type stretching machine in a stretch ratio of 4 to 12 times while applying a tensile strength of 5-50 N/cm$^2$ to the machine direction, and stretching in the transverse direction is performed by stretching the film introduced into the tenter-type stretching machine in a stretch ratio of 4 to 9 times while applying a tensile strength of 100-700 N/cm$^2$ to the machine direction.

6. The method of claim 5, further comprising a heat setting process that uses tenter-type heat setting equipment, after the extraction in step (c), to stretch the film for 20-100% in the transverse direction, and then, shrinking the film to have a width of 5-50%, compared to the film prior to shrinking, while conducting thermal relaxation in a range of temperatures in which 5 to 50% of the crystalline portion of the polyolefin in the film is melted.

7. The method of claim 6, wherein the stretching includes: (a) stretching in the machine direction wherein the temperature of the preheating roll ranges from a [melting temperature of the resin in the sheet–50° C.] to a [temperature at which 70% of the crystalline portion of the resin of the sheet is melted], the temperature of the stretching roll ranges from the [melting temperature of the resin in the sheet–50° C.] to a [temperature at which 90% of the crystalline portion of the resin in the sheet is melted], the temperature of the cooling roll is a [temperature of the stretching roll–5° C.] or less, or air-cooling is conducted, so that a sheet width holding ratio between rolls in the stretching roll after stretching ranges from 70 to 99% and an overall sheet width holding ratio after stretching in the machine direction ranges from 50 to 95%; and (b) stretching in the transverse direction wherein the tenter-type stretching machine includes a preheating part, a stretching part, and a heat setting part, and the temperature of the preheating part is a [melting temperature of the resin in the sheet+20° C.] or less, the temperature of the stretching part ranges from a [melting temperature of the resin in the sheet–20° C.] to the [melting temperature of the resin in the sheet+10° C.], and the temperature of the heat setting part is the [melting temperature of the resin in the sheet] or less.

8. The method of claim 7, wherein a total roll contact time of the cooling roll during stretching in the machine direction ranges from 1 to 120 seconds.

* * * * *